United States Patent [19]

Komuro et al.

[11] Patent Number: 5,115,490
[45] Date of Patent: May 19, 1992

[54] VARIABLE LENGTH DATA PROCESSING APPARATUS WITH DELIMITER LOCATION-BASED ADDRESS TABLE

[75] Inventors: Junichi Komuro; Tetsuya Sato; Norihiro Hidaka, all of Tokyo, Japan

[73] Assignee: Casio Computer Co., Ltd., Tokyo, Japan

[21] Appl. No.: 375,386

[22] Filed: Jul. 3, 1989

[30] Foreign Application Priority Data

Jul. 15, 1988 [JP] Japan ............................... 63-175111
Dec. 9, 1988 [JP] Japan ............................... 63-311346
Dec. 9, 1988 [JP] Japan ............................... 63-311347

[51] Int. Cl.$^5$ .................... G06F 3/00; G06F 7/04; G06F 15/40
[52] U.S. Cl. .................................... 395/400; 395/600
[58] Field of Search ... 364/200 MS File, 900 MS File

[56] References Cited

U.S. PATENT DOCUMENTS

| | | | |
|---|---|---|---|
| 3,822,378 | 7/1974 | Kashio | 364/200 |
| 4,003,031 | 1/1977 | Kashio | 364/200 |
| 4,031,515 | 6/1977 | Kashio | 364/200 |
| 4,032,900 | 6/1977 | Kashio | 364/200 |
| 4,034,350 | 7/1977 | Kashio | 364/200 |
| 4,064,553 | 12/1977 | Kashio | 364/200 |
| 4,079,234 | 3/1978 | Kashio | 364/200 |
| 4,103,334 | 7/1978 | Kashio | 364/200 |
| 4,133,041 | 1/1979 | Kashio | 364/200 |
| 4,145,753 | 3/1979 | Kashio | 364/200 |
| 4,306,287 | 12/1981 | Huang | 364/200 |
| 4,376,933 | 3/1983 | Saran et al. | 364/900 X |
| 4,456,953 | 6/1984 | Cohen et al. | 364/200 |

FOREIGN PATENT DOCUMENTS

| | | |
|---|---|---|
| 0032075A1 | 7/1981 | European Pat. Off. . |
| 53-46689 | 12/1978 | Japan . |
| 57-51137 | 10/1982 | Japan . |
| 57-56093 | 11/1982 | Japan . |
| 58-46735 | 10/1983 | Japan . |
| 58-53384 | 11/1983 | Japan . |
| WO81/00633 | 3/1981 | PCT Int'l Appl. . |

Primary Examiner—Joseph A. Popek
Assistant Examiner—Michael A. Whitfield
Attorney, Agent, or Firm—Frishauf, Holtz, Goodman & Woodward

[57] ABSTRACT

Variable length data stored in a RAM are sequentially read out by designating their addresses. It is detected whether or not the readout data is a code indicating a delimitation of, e.g., a word block, record block, file block, or the like. If it is detected that the readout data is a code indicating a delimitation, an address at that time is latched, thus forming an address table based on the latched address. The address table thus formed is utilized upon retrieval of data in the RAM, thus allowing high-speed data access.

9 Claims, 6 Drawing Sheets

VARIABLE LENGTH DATA PROCESSING APPARATUS WITH DELIMITER LOCATION-BASED ADDRESS TABLE

BACKGROUND OF THE INVENTION

1. Field of the Invention

The present invention relates to an apparatus for processing variable length data in which words, records, files, and the like are delimited by delimiter codes.

2. Description of the Related Art when data processing is performed in a variable length data format, processed variable length data are delimited by word and record delimiter codes in units of words and records, and are sequentially arrayed and stored on a memory. When processing is performed for the variable length data string arrayed and stored on the memory, the variable length data string is sequentially read out from the memory and the word and record delimiter codes are retrieved. For example, when a second word in each record in the memory is extracted to perform updating processing, a record delimiter code in the memory is retrieved, and a first word delimiter code from the retrieved record delimiter code is retrieved to extract the second word (because the second word is arrayed to follow the first word). In order to extract the second word in each record, the above retrieval processing must be repetitively executed.

In this manner, in the conventional system, every time processing is performed for the variable length data string which is delimited by various delimiter data such as delimiter codes, the above-mentioned retrieval processing must be executed, resulting in a time-consuming operation.

This also applies to a case wherein a word to be processed in each record is predetermined, e.g., a variable word is a second word and other words are fixed words. The retrieval processing must be executed every time processing for the word to be processed is performed.

SUMMARY OF THE INVENTION

It is an object of the present invention to provide a variable length data processing apparatus wherein a table is formed based on addresses of delimiter codes of variable length data stored in a memory, and is referred to upon data access to allow high-speed access of corresponding variable length data.

In order to achieve the above object, according to the present invention, there is provided a data processing apparatus which accesses storage means storing variable length data delimited by delimiter codes to perform data processing, comprising:

controlling means, connected to said storage means through an address bus, for designating an address through said address bus every time one clock is generated, reading out data stored at the designated address onto a data bus, and incrementing the address every time the data is read out;

detecting means, connected to said data bus, for detecting in response to every clock whether or not the data on said data bus coincides with the delimiter code indicating a delimitation of a data block;

latching means, connected to said address bus, for, when said detecting means detects a coincidence, latching the address on said address bus;

table means for storing address data based on the address latched in said latching means; and processing means for designating a start address of each data block stored in said storage means with reference to the address data stored in said table means and performing processing for each data block.

According to the present invention, a table based on addresses indicating delimiter positions of variable length data stored in a memory can be easily formed. When desired data in the memory is read out and processing, e.g., updating of the readout data is to be performed, high-speed access can be performed by utilizing the table.

DETAILED DESCRIPTION OF THE PREFERRED EMBODIMENT

Figure 1:
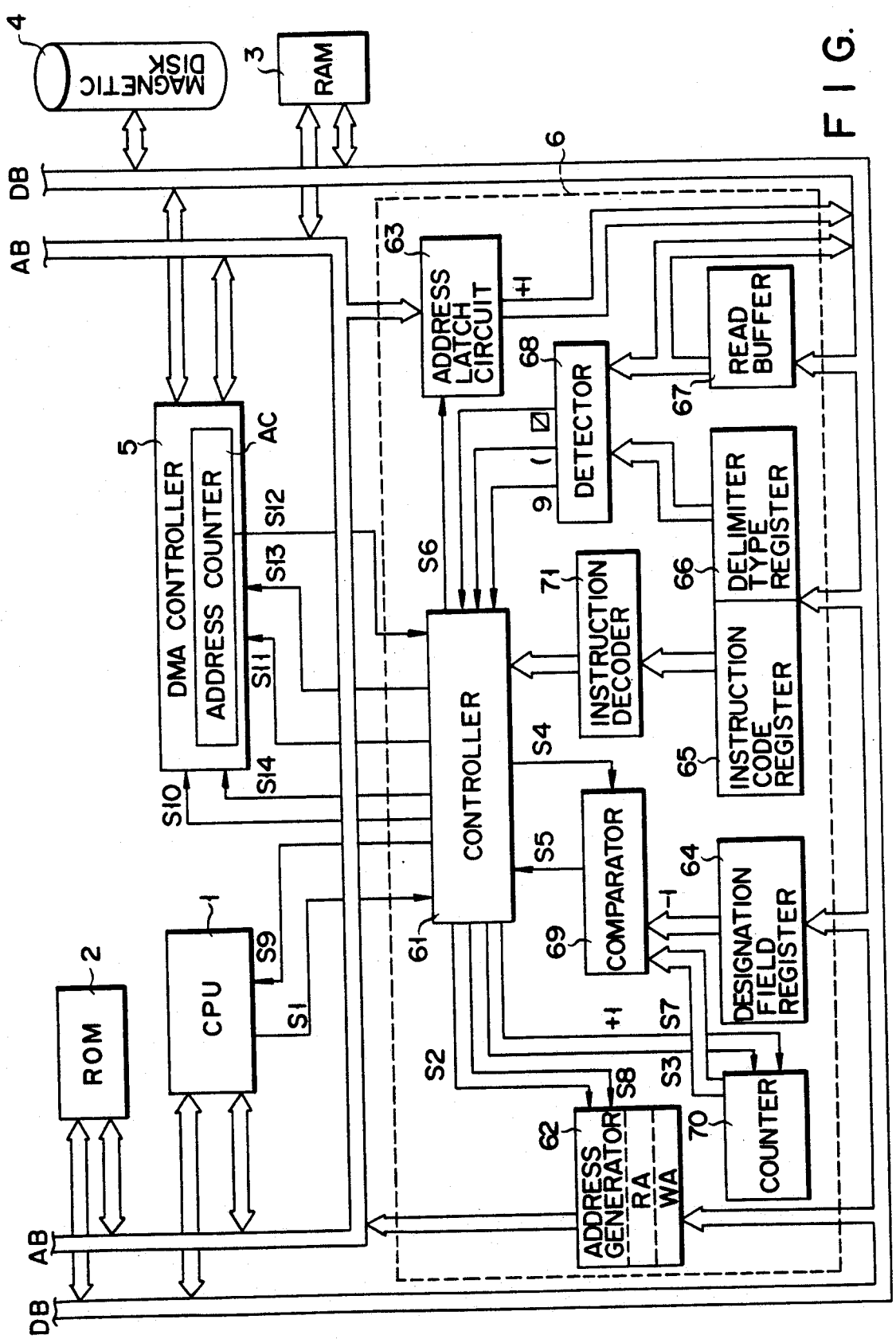
FIG. 1 is a block diagram for explaining an embodiment of the present invention.

FIG. 1 is a block diagram of a variable length data processing apparatus according to an embodiment of the present invention.

The variable length data processing apparatus processes variable length data in which words and records are delimited by delimiter codes. The apparatus processes variable length data stored in a RAM 3 in accordance with a program prestored in a ROM 2 under the control of a CPU 1. The RAM 3 is connected to the CPU 1 and the ROM 2 through an address bus AB and a data bus DB. The address bus AB and the data bus DB are connected to a magnetic disk 4 for storing a large volume of variable length data and a DMA controller 5 for directly transferring a portion of the variable length data stored in the magnetic disk 4.

The address bus AB and the data bus DB are also connected to a delimiter detection unit 6. The delimiter detection unit 6 detects various delimiter codes, i.e., a delimiter code "," indicating a delimitation of a word, a delimiter code "(" indicating a delimitation of a record, a delimiter code "☐" a delimitation of a file, and the like, on the data bus DB, reads out an address in the RAM 3 in which the detected delimiter code is stored, and performs various processing operations such as creation of an address table based on the readout address under the control of a controller 61. The delimiter detection unit 6 includes an address generator 62 and an address latch circuit 63 which are connected to both the data bus DB and the address bus AB, and a designated field register 64, an instruction code register 65, a delimiter type register 66, a read buffer 67, and a detector 68 which are connected to the data bus DB. The designated field register 64 is connected to a comparator 69. The comparator 69 is connected to a counter 70. The instruction code register 65 is connected to an instruction decoder 71. A decoded output from the instruction decoder is supplied to the controller 61.

The circuits of the delimiter detection unit 6 will be described below in detail.

The address generator 62 has a read address register RA and a write address register WA. Upon reception of a start signal S2 from the controller 61, the generator 62 starts a cyclic operation consisting of a read cycle and a write cycle on the basis of a clock signal generated by a clock generator (not shown). In the read cycle, the generator 62 outputs the content of the read address register RA onto the address bus AB. Upon completion of the read cycle, the generator 62 increments the content of the read address register by "1". When the generator 62 receives a latch completion signal S8 from the controller 61, it outputs the content of the write address register WA onto the address bus AB, and increments the content of the write address register WA by "1" after the lapse of a predetermined period of time from the outputting.

Upon reception of an address latch signal S6 from the controller 61, the address latch circuit 63 fetches the address data present on the address bus AB at that time, increments the data by "1"0 and outputs it onto the data bus DB.

The designated field register 64 stores data indicating the order of words to be designated on one record. When this data is supplied to the comparator 69, it is decremented by "1" and is compared with the content of the counter 70.

The instruction code register 65 stores an instruction code determining the operation of the delimiter detection unit 6. The register 65 causes the instruction decoder 71 to decode a table formation instruction code INS1, a specific field table formation instruction code INS2, a data transfer instruction code INS3, or the like in accordance with the instruction code, thus determining the control operation of the controller 61.

The delimiter codes ","0 "(", "□"0 and the like are preset in the delimiter type register 66, and are supplied to the detector 68. The detector 68 is a circuit for detecting whether or not the content of the read buffer 67 for temporarily storing data read out from the RAM 3 onto the data bus DB coincides with any one of the delimiter codes preset in the delimiter type register 66. When a coincidence is detected, the detector outputs a detection signal of the corresponding delimiter code to the controller 61. When a noncoincidence is detected, the detector outputs no detection signal.

The controller 61 performs a control operation in accordance with the instruction code set in the instruction code register 65. For example, when the specific field table formation instruction code INS2 is set in the instruction code register 65, the controller 61 performs signal I/O control as follows.

(1) When the controller 61 receives a processing start signal S1 from the CPU 1, it outputs a start signal S2 to the address generator 62.

(2) When the controller 61 receives the delimiter code "(" indicating a record delimitation from the detector 68, it outputs a reset signal S3 to the counter 70.

(3) When the controller 61 receives the delimiter code "," indicating a word delimitation from the detector 68, it outputs a comparison signal S4 to the comparator 69, and, after the lapse of a predetermined period of time, outputs a count-up signal S7 to the counter 70.

(4) when the controller 61 receives the delimiter code "gg" indicating a file delimitation from the detector 68, it outputs a processing end signal S9 to the CPU 1.

(5) When the controller 61 receives a coincidence signal S5 from the comparator 69, it outputs a latch signal S6 to the address latch circuit 63, and then outputs a latch completion signal S8 to the address generator 62.

When the data transfer instruction code INS3 is set in the instruction code register 65, the controller 61 performs signal I/O control as follows.

(1) When the controller 61 receives a processing start signal S1 from the CPU 1, it outputs a start signal S10 to the DMA controller 5.

(2) When the controller 61 receives the delimiter code "(" or "," indicating a record or word delimitation from the detector 68, it outputs a latch signal S6 to the address latch circuit 63, and then outputs an interruption signal S11 to the DMA controller 5.

When the controller 61 receives the delimiter code "□" indicating a file delimitation from the detector controller 5, and outputs a processing end signal S9 to the CPU 1.

(4) When the controller 61 receives an interrupted signal S12 from the DMA controller 5, it outputs a latch completion signal S8 to the address generator 62, and then outputs an interruption completion signal S13 to the DMA controller 5.

The DMA controller 5 will now be described.

The DMA controller 5 has an address counter AC. When the controller 5 receives the start signal S10 from the controller 61, it starts a data transfer operation on the basis of a clock signal from a clock generator (not shown). The controller 5 reads out unit data from the magnetic disk 4 onto the data bus DB, and outputs the content of the address counter AC onto the address bus AB to designate an address of the RAM 3. Then, the controller 5 transfers the unit data on the data bus DB to the designated address position in the RAM 3. The controller 5 repeats this operation in response to every clock signal, so that each unit data in the magnetic disk 4 is transferred to the RAM 3 at high speed. The address counter AC is incremented by "1" every time the unit data is transferred. When the DMA controller 5 receives the interruption signal S11 from the controller 61, it interrupts the data transfer operation (stops a clock operation), and then sends the interrupted signal S12 to the controller 61. Upon reception of the interruption completion signal S13 from the controller 61, the DMA controller 5 restarts the interrupted data transfer operation. Upon reception of an end signal S14, the controller 5 ends a series of data transfer operations.

The operation of the embodiment of the present invention will be described hereinafter.

Figure 2:
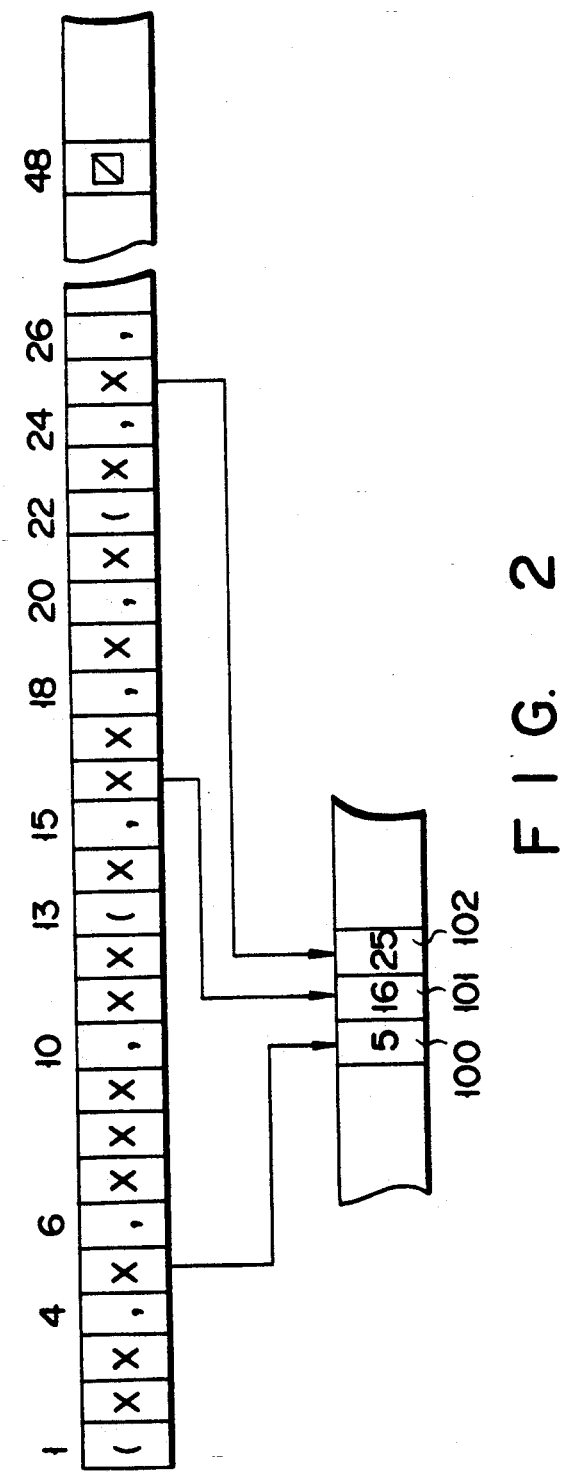
FIG. 2 is a view showing a first example of an address table.

A case will be described below wherein an address table of designated words is formed, e.g., wherein the address table of second words in records is formed, as shown in FIG. 2.

FIG. 2 shows a case wherein the start address of a second word of each record stored in an area starting from address "1" in the RAM 3 is written in a table area of the RAM 3, i.e., a table area starting from address "100"0 thereby forming an address table. Since the start address of the second word of the first record is "5"0 the address "5" data is written at address "100" Since the start address of the second word of the second record is "16"0 the address "16" data is written at address "101". Since the start address of the second word of the third record is "25"0 the address "25" data is written at address "102". Similarly, the start addresses of the second words of the following records are written in an area after address "103", thus forming the address table.

In this manner, when the address table of the designated words is formed, if an instruction for adding all the second words of the records is input, the addresses of the second words of the records can be directly detected with reference to this address table, and an access speed can be increased. Therefore, word addition processing can be performed at high speed.

Figure 3:
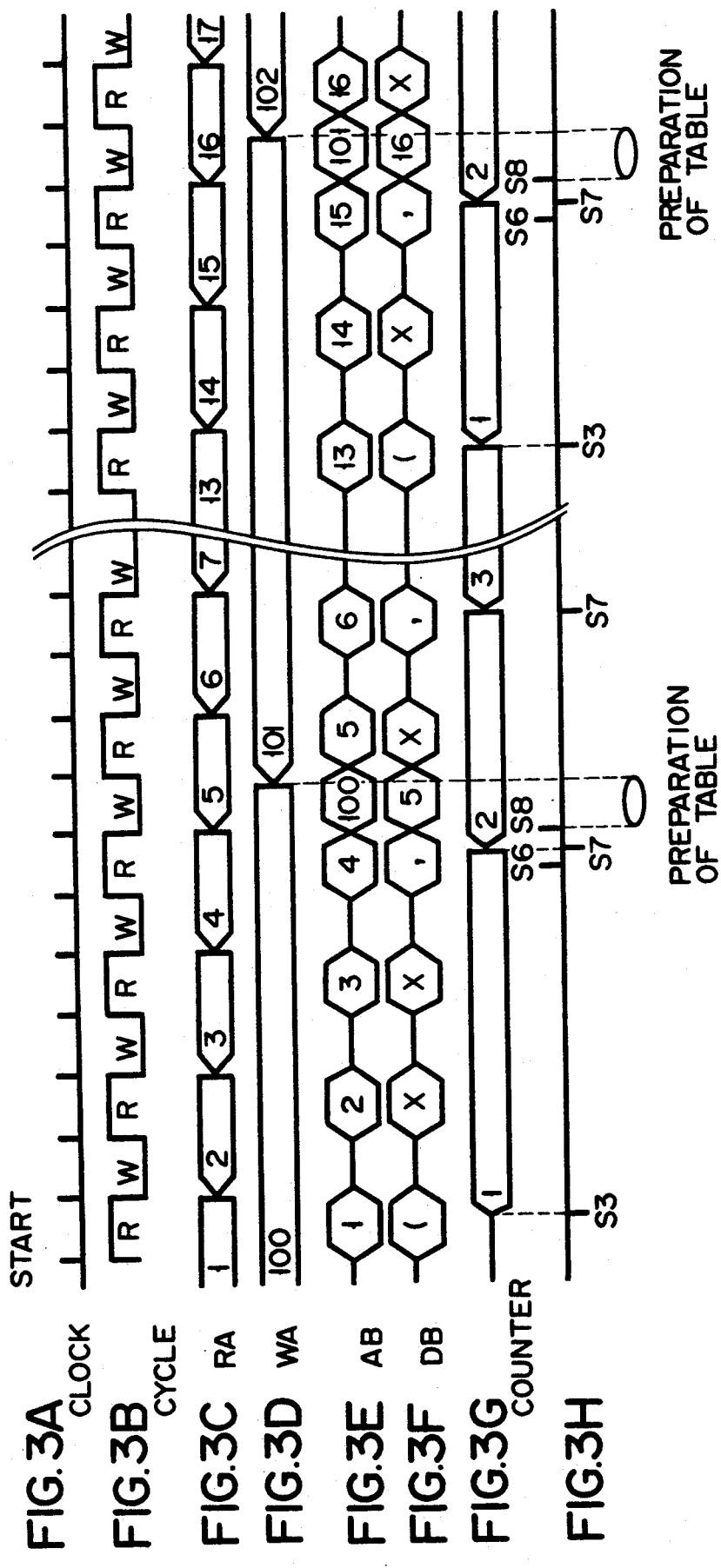
FIGS. 3A throughh 3H show first timing charts.

An operation for forming the address table shown in FIG. 2 using the block circuit shown in FIG. 1 will be described in detail below with reference to the timing chart shown in FIG. 3.

Various registers are initialized prior to address table formation processing. More specifically, the CPU sets data "1" and "100" as initial values in the read address register RA and the write address register WA, and sets data "2" in the designated field register 64. The CPU 1 then sets the delimiter codes ",''0 "(''0 and "☐" in the delimiter type register 66, and sets the specific field table formation instruction code INS2 in the instruction code register 65.

After these setting operations, the CPU 1 outputs the processing start signal S1 to the controller 61, and transfers all the control to the controller 61.

Upon reception of the processing start signal S1 from the CPU 1, the controller 61 outputs the start signal S2 to the address generator 62. More specifically, the address generator 62 outputs address data stored in the read address register RA onto the address bus AB in a first read cycle, and reads out data stored in the corresponding address area in the RAM 3 onto the data bus DB. The data read out onto the data bus DB is fetched in the read buffer 67, and the detector 68 judges whether or not the fetched data coincides with any one of the delimiter codes set in the delimiter type register 66. Since data stored in the address area "1" in the RAM 3 is the delimiter code "(''0 its detection signal is output to the controller 61. When the controller 61 receives the detection signal of the delimiter code "(''0 it outputs the reset signal S3 to the counter 70 to reset the content of the counter 70 to "1". Since no address latch operation is performed in this read cycle, the address generator 62 does not output address data stored in the write address register WA onto the address bus AB in the following write cycle, and no write access to the RAM 3 is performed. Upon completion of the read cycle, the value of the read address register RA is incremented by "1''0 i.e., to "2".

Thereafter, in the next read cycle, the content of the read address register RA is output onto the address bus AB, and data, i.e., "x" stored in the corresponding address area in the RAM 3 is read out onto the data bus DB. This data is fetched in the read buffer 67. Since this data is not a delimiter code, the detector 68 does not output a detection signal, and hence, no write access to the RAM 3 is performed in the following write cycle.

In the next read cycle, since data "x" is output onto the data bus DB, no write access to the RAM 3 is performed, either, in the following write cycle.

In the fourth read cycle, since the delimiter code "," is output onto the data bus DB, this code is detected by the detector 68, and its detection signal is output to the controller 61. Upon reception of the detection signal of the delimiter code ",''0 the controller 61 outputs the comparison signal S4 to the comparator 69, so that a value "1" obtained by decrementing data "2" stored in the designated field register 64 is compared with a count value stored in the counter 70. In this case, since the data "1" is set in the counter 70, the comparator 69 detects a coincidence between the two data, and supplies the coincidence signal S5 to the controller 61.

When the controller 61 receives the coincidence signal S5, it outputs the latch signal S6 to the address latch circuit 63. Thus, the address latch circuit 63 latches address data at that time, i.e., "4". Thereafter, the controller 61 outputs the count-up signal S7 to the counter 70 to update the value of the counter 70 to "2". The controller 61 outputs the latch completion signal S8 to the address generator 62. The address generator 62 outputs address data, i.e., "100", stored in the write address register WA onto the address bus AB to designate the corresponding address area in the RAM 3. In this case, data obtained by incrementing the address data latched in the address latch circuit 63 by "1", i.e., "538 0 is supplied onto the data bus DB. The data "5" on the data bus DB is stored at address "100" in the RAM 3. After the data storage operation, the address generator 62 increments the value of the write address register WA by "1".

In the fifth read cycle, since data "x" is detected on the data bus DB, a detection operation by the detector 68 is not performed, and hence, no data storage processing is performed in the following write cycle.

In the sixth read cycle, since the delimiter code "," is detected on the data bus DB, this code is detected by the detector 68, and its detection result is supplied to the controller 61. Upon reception of this detection signal, the controller 61 outputs the comparison signal S4 to the comparator 69, so that a value "1" obtained by decrementing data stored in the designated field register 64 by "1" is compared with a count value stored in the counter 70. In this case, since the counter 70 stores data "2"0 the comparator 69 does not output the coincidence signal S5. As a result, the controller 61 does not output the latch signal S6 to the address latch circuit 63, and hence, no data storage processing is performed in the following write cycle. In this read cycle, the controller 61 outputs the count-up signal S7 to the counter 70 to update the value of the counter 70 to "3".

Similarly, the data readout processing is sequentially performed. When the delimiter code "(" is read out onto the data bus DB in the 13th read cycle, this code is detected by the detector 68, and its detection result is supplied to the controller 61. Upon reception of this detection signal, the controller 61 outputs the reset signal S3 to the counter 70 to reset the content of the counter 70 to "1".

In the 14th read cycle, since data "x" is output onto the data bus DB, the detector 68 does not output the detection signal.

In the 15th read cycle, the delimiter code "," is output onto the data bus DB, and this code is detected by the detector 68. The controller 61 then supplies the comparison signal S4 to the comparator 69, so that a value "1" obtained by decrementing data stored in the designated field register 64 by "1" is compared with a count value stored in the counter 70. In this case, since the counter 70 stores data "1", the comparator 69 outputs the coincidence signal S5, and the controller 61 outputs the latch signal S6 to the address latch circuit 63 to cause it to latch address data at that time, i.e., "15". Thereafter, the controller 61 outputs the count-up signal S7 to the counter 70, and outputs the latch completion signal S8 to the address generator 62. The address generator 62 outputs address data, i.e., "101" stored in the write address register WA onto the address bus AB in the following write cycle. In this case, data obtained by incrementing the address data latched in the address latch circuit 63 by "1''0 i.e., data "16" is supplied onto the data bus DB. This data "16" is stored at address "101" in the RAM 3.

In this manner, the data stored in the RAM 3 are sequentially read out, and are subjected to delimiter detection in the detector 68. If the delimiter code "(" indicating the record delimitation is detected, the counter 70 is detected. If the delimiter code "," indicating a word delimitation is detected, the comparator 69 checks if this code is a code stored immediately before the designated word in one record, i.e., a delimiter code stored immediately before the second word. If it is determined that the detected code is the delimiter code stored immediately before the second word, the address in the RAM 3 at which this delimiter code is stored is latched in the address latch circuit 63. Data obtained by incrementing this address value by "1" is sequentially stored in the table area in the RAM 3.

When the detector 68 detects the delimiter code "□" indicating a file delimitation, the controller 61 ends the address table formation processing, and outputs the end signal S9 to the CPU 1, thus transferring all the control to the CPU 1.

With the series of processing operations described above, the start addresses of the second words of the records in a predetermined file in the RAM 3 are stored in the designated address table area in the RAM 3.

Therefore, the CPU 1 refers to the address table to directly detect the start addresses of the second words of the records in the file, and updating processing or the like for one file can be performed at high speed.

Since the address table formation processing is performed by a special-purpose circuit, it can be performed at very high speed.

A case will be described below wherein an address table of words is formed simultaneously when variable length data stored in the magnetic disk 4 are DMA-transferred into the RAM 3.

Figure 4:
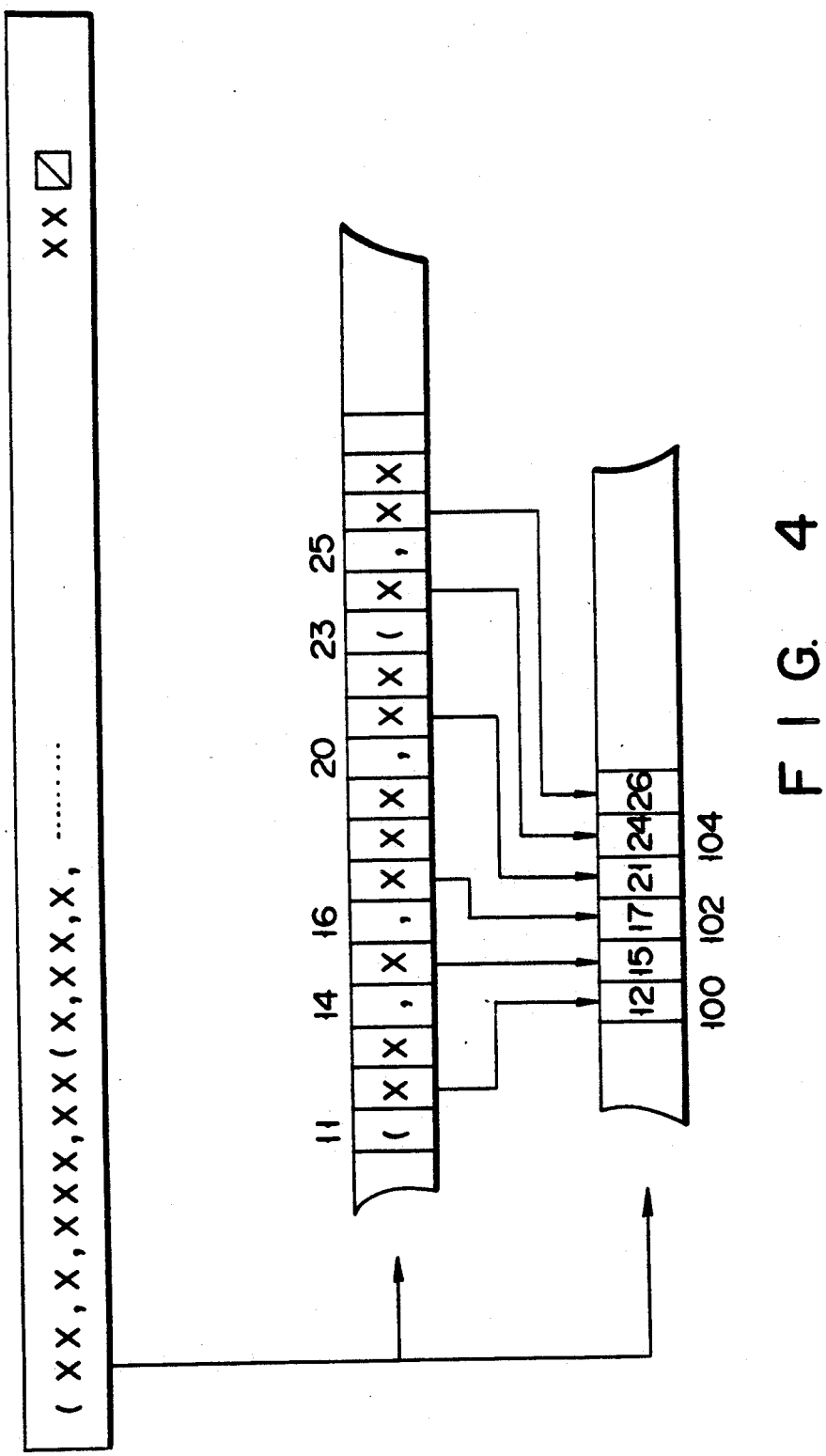
FIG. 4 is a view showing a second example of the address table.

FIG. 4 shows a case wherein variable-length word data stored in the magnetic disk 4 are sequentially transferred to and stored in an area starting from address "11" in the RAM 3, and at the same time, the start address of the words stored in the RAM 3 in this manner are stored in the table area in the RAM 3, i.e., in an area starting from address "100"0 thus forming an address table Since the start addresses of the words are "12"0 "15"0 "17"0 "21"0 "24"0 "26"0 . . . , they are stored at addresses "100"0 "10138 0 "102"0 . . . to form the address table.

In this manner, the data are transferred from the magnetic disk 4 to the RAM 3, and at the same time, the address table storing the start addresses of the words stored in the RAM 3 is formed. Therefore, after the above-mentioned data transfer, a desired word can be directly accessed based on the address table, and updating processing of words, or the like can be performed at high speed.

Figure 5:
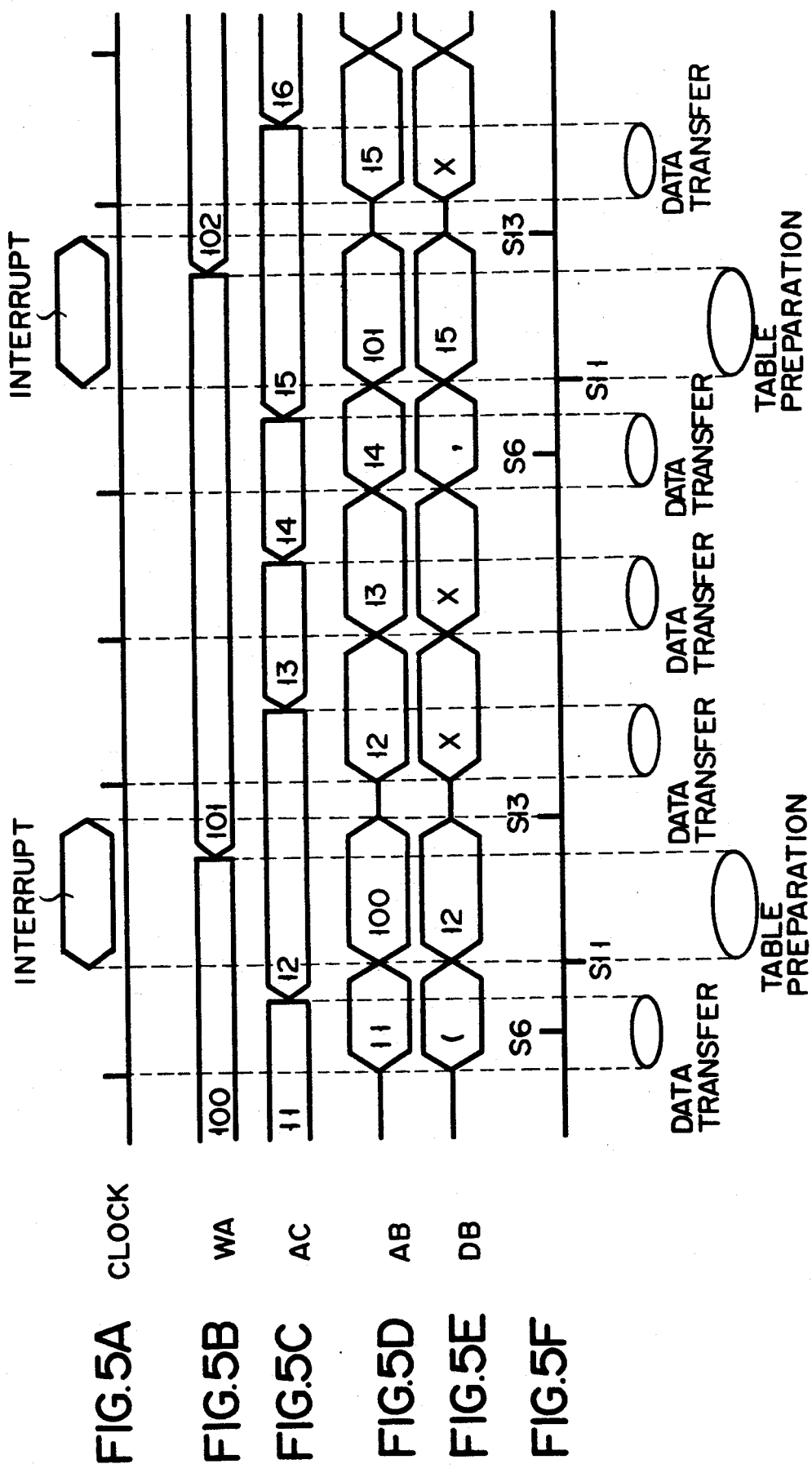
FIGS. 5A through 5F show second timing charts.

The data transfer operation shown in FIG. 4 and the operation for forming the address table using the block circuit shown in FIG. 1 will be described in detail below with reference to the timing chart in FIG. 5.

Prior to data transfer processing, various initialization operations are performed. More specifically, the CPU 1 sets data "100" as an initial value in the write address register WA, and sets data "11" as an initial value in the address counter AC of the DMA controller 5. The CPU 1 sets the delimiter codes ","0 "("0 and "□" in the delimiter type register 66, and sets the data transfer instruction code INS3 in the instruction code register 65.

After these setting operations, the CPU 1 outputs the processing start signal S1 to the controller 61, thus transferring all the control to the controller 61.

Upon reception of the processing start signal S1 from the CPU 1, the controller 61 outputs the start signal S10 to the DMA controller 5. More specifically, the DMA controller 5 outputs the address data stored in the address counter AC onto the address bus AB, and at the same time, reads out unit data from the magnetic disk 4. Since the address counter AC stores the data "11" as the initial value, address "11" of the RAM 3 is designated, and data stored at the start address of the magnetic disk 4, i.e., the delimiter code "(" is read out onto the data bus DB. The readout code is stored at address "11" of the RAM 3. The data read out onto the data bus DB is fetched in the read buffer 67 at the same time, and it is checked if the fetched code coincides with the delimiter code set in the delimiter type register 66. In this case, since the readout data is the delimiter code "("0 its detection signal is output to the controller 61. Upon reception of the detection signal, the controller 61 outputs the latch signal S6 to the address latch circuit 63 to cause it to latch address data at that time, i.e., "11". After the data transfer is completed, the DMA controller 5 increments the value of the address counter AC by "1" to "12". Thereafter, the controller 61 outputs the interruption signal S11 to the DMA controller 5. Upon reception of the interruption signal S11, the DMA controller 5 temporarily interrupts the readout operation of the data from the magnetic disk 4, and outputs the interrupted signal S12 to the controller 61. When the controller 61 receives the interrupted signal S12, it outputs the latch completion signal S8 to the address generator 62. The address generator 62 outputs address data stored in the write address register WA, i.e., "100" onto the address bus AB, and designates the corresponding address in the RAM 3. At this time, data obtained by incrementing address data latched in the address latch circuit 63 by "1"0 i.e., data "12" is supplied onto the data bus DB. The data "12" on the data bus DB is stored at address "100" in the RAM 3. After the storage operation, the address generator 62 increments the value of the write address register WA by "1". Thereafter, the controller 61 outputs the interruption completion signal S13 to the DMA controller 5. Upon reception of the interruption completion signal S13, the DMA controller 5 restarts the data readout operation.

When the DMA controller 5 restarts the data readout operation, it outputs address data stored in the address counter AC onto the address bus AB in synchronism with the clock, and at the same time, reads out unit data from the magnetic disk 4. Since the address counter AC stores data "12"0 address "12" of the RAM 3 is designated, and the second data stored in the magnetic disk 4, i.e., data "x" is read out onto the data bus DB. and is stored at address "12" of the RAM 3. The data read out onto the data bus DB is fetched in the read buffer 67 at the same time, and the detector 68 judges whether or not the fetched data is the delimiter code set in the delimiter type register 66. In this case, since the readout data is not a delimiter code, the detector 68 outputs no detection signal, and only the data transfer operation is performed. After the data storage operation in the RAM 3, the value of the address counter AC is incremented by "1" to "13".

In synchronism with the next clock, the third unit data stored in the magnetic disk 4 is transferred to address "13" of the RAM 3. Since this data is not a delimiter code, either, only the data transfer operation is performed.

In synchronism with the next clock, the fourth unit data stored in the magnetic disk 4 is transferred to address "14" of the RAM 3. Since this data is the delimiter code ","0 the detector 68 outputs a detection signal. Upon reception of the detection signal, the controller 61 outputs the latch signal S6 to the address latch circuit 63 to cause it to latch address data at that time, i.e., "14". The latched address data is incremented by "1"0 and the incremented data "15" is stored at an address designated by the address generator 62, i.e., address "101" in the RAM 3.

Similarly, when data stored in the magnetic disk is transferred to the RAM 3, this data is simultaneously detected by the detector 68. If the data to be transferred to the RAM 3 is the delimiter code, an address next to that of the RAM 3 at which this delimiter code is stored is read out as data, and is sequentially stored in the table area in the RAM 3.

When the detector 68 detects the delimiter code "□" indicating a file delimitation, the controller 61 outputs an operation end signal S14 to the DMA controller 5, thus stopping the data transfer operation of the DMA controller 5. The controller 61 outputs the end signal S9 to the CPU 1 to transfer all the control to the CPU 1.

With the series of operations described above, variable length data for one file stored in the magnetic disk 4 are transferred to the RAM 3, and the storage position of each transferred word in the RAM 3, i.e., the start address of each word is stored in the predetermined address table area in the RAM 3.

Therefore, after the data is transferred from the magnetic disk 4 to the RAM 3, the CPU 1 can refer to the address table to directly detect the storage position of a word, and perform high-speed word access.

Figure 6:
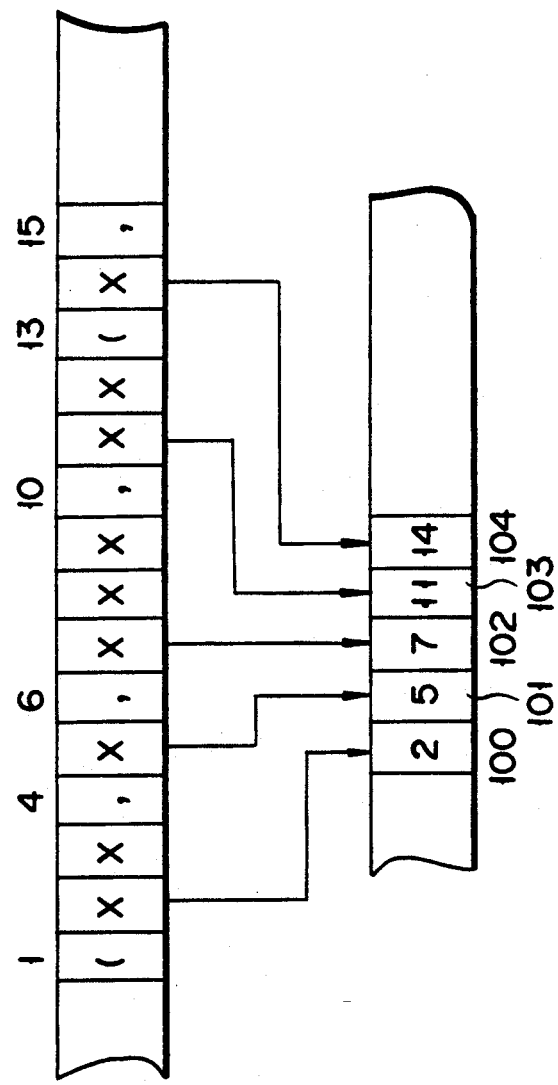
FIG. 6 is a view showing a third example of the address table.

In the above embodiment, the operations based on the specific field table formation instruction code INS2 and the data transfer instruction code INS3 have been described. An operation based on the table formation instruction code INS1 is performed in the same manner as described above More specifically, the operation based on the table formation instruction code INS1 corresponds to a partial modification of the operation based on the instruction code INS2. That is, when the detector 68 detects the delimiter code "," or "("0 the latch signal S6 is output based on this detection. Therefore, in this case, the start addresses of all the words are stored in the address table. FIG. 6 shows this state.

In the above embodiment, when a delimiter code is detected and an address at that time is latched, a value obtained by incrementing the address data by "1" is stored in the address table. However, the latched address itself may be stored in the address table.

If a delimiter code to be set in the delimiter type register 66 is appropriately selected, an address table indicating only a delimitation position of each word, an address table indicating only a delimitation position of each record, and an address table indicating only a delimitation position of each file, can be arbitrarily formed.

What is claimed is:

1. A data processing apparatus which accesses a storage means which stores a plurality of data blocks, each data block comprising variable length data delimited by delimiter codes to perform data processing, the data processing apparatus comprising:

controlling means, coupled to said storage means through an address bus, said controlling means including:
means for designating an address through said address bus every time one clock signal is generated,
means for reading out from said storage means data stored at a designated address onto a data bus, said designated address being designated by said means for designating an address, and
means for incrementing the designated address every time the data is read out from said storage means;
detecting means, coupled to said data bus, for detecting in response to every clock signal whether or not data on said data bus coincides with a delimiter code of a data block, which delimiter code indicates a delimitation of a data block;
latching means, coupled to said address bus, for, when said detecting means detects a coincidence, latching the address on said address bus;
table means for storing address data based on the address latched by said latching means; and
processing means for designating a start address of each data block stored in said storage means as a function of the address data stored in said table means, and for performing a data processing operation for each data block.

2. The apparatus according to claim 1, wherein:
said storage means stores said variable length data delimited by various different delimiter codes; and
said detecting means further includes means for detecting whether or not the data on said data bus coincides with a specific delimiter code indicating a delimitation of a desired data block.

3. The apparatus according to claim 2, wherein the specific delimiter comprises a code indicating a delimitation of a variable length word data block.

4. The apparatus according to claim 2, wherein the specific delimiter code comprises a code indicating a delimitation of a variable length record data block.

5. The apparatus according to claim 2, wherein the specific delimiter code comprises a code indicating a delimitation of a variable length file data block.

6. The apparatus according to claim 2, wherein said detecting means further includes a register for storing the specific delimiter code.

7. The apparatus according to claim 3, further comprising:
a counter which is reset upon detection of a delimiter code indicating a record block delimitation, and which is incremented upon detection of a delimiter code indicating a word block delimitation;
a register for storing a predetermined designated value; and
comparison means for comparing a value of said counter with a said predetermined designated value of said register;
and wherein said latching means includes means for, when a coincidence signal is obtained from said comparison means, latching the address on said address bus.

8. An apparatus for forming an address table for a storage means for storing variable length data as an object to be processed, comprising:
a read address register for storing first address indicating a readout start position of the variable length data;

a write address register for storing second address indicating a write position of said address table;

reading out means, coupled to said storage means through an address bus, for designating an address of said storage means on the basis of the first address stored in said read address register in response to every clock signal, and for reading out corresponding stored data;

detecting means, coupled to said storage means through a data bus, for detecting whether or not the corresponding stored data read out by said reading out means coincides with a delimiter code;

latching means, coupled to said address bus, for, when said detecting means detects a coincidence, latching an address on said address bus;

writing means for designating a storage area of said address table on the basis of the second address indicating a write position of said address table storage in said write address register every time the address on said address bus is latched by said latching means, and writing address data based on the address latched in said latching means in a corresponding storage area; and incrementing means for incrementing the first address of said read address register every time the data is read out by said reading out means, and for incrementing the second address of said write address register every time the address data is written by said writing means.

9. A data processing apparatus for processing data on the said of first storage means and second storage means for storing a plurality of data blocks, comprising:

controlling means, coupled to said first and second storage means through a data bus and an address bus, for performing, in response to every clock signal, the following operations:
  reading, onto said data bus, data from said first storage means,
  designating an address of said second storage means, for storing the read out data in said second storage means at a location designated by the address,
  incrementing the address, and repeating the above operations upon every write access;

detecting means, connected to said address bus, for detecting in response to every clock signal whether or not the data on said data bus coincides with a delimiter code indicating a delimitation of a data block;

latching means, connected to said address bus, for, when said detecting means detects a coincidence, latching an address on said address bus;

table means for storing address data based on the address latched by said latching means; and processing means for designating a start address of each data block written in said second storage means with reference to the address data stored in said table means and performing processing for each data block.

* * * * *